United States Patent
Zabeida et al.

(10) Patent No.: US 12,117,591 B2
(45) Date of Patent: Oct. 15, 2024

(54) ARTICLE COATED WITH A LOW REFRACTIVE INDEX LAYER BASED ON FLUORINATED ORGANOSILICON COMPOUNDS

(71) Applicants: CORPORATION DE L'ECOLE POLYTECHNIQUE DE MONTREAL, Montreal (CA); ESSILOR INTERNATIONAL, Charenton-le-Pont (FR)

(72) Inventors: Oleg Zabeida, Monteal (CA); William Trottier-Lapointe, Charenton-le-Pont (FR); Ludvik Martinu, Montreal (CA)

(73) Assignees: Corporation de l'Ecole Polytechnique de Montreal, Québec (CA); Essilor International, Charenton-le-Pont (FR)

( * ) Notice: Subject to any disclaimer, the term of this patent is extended or adjusted under 35 U.S.C. 154(b) by 532 days.

(21) Appl. No.: 17/428,738

(22) PCT Filed: Feb. 4, 2020

(86) PCT No.: PCT/EP2020/052740
§ 371 (c)(1),
(2) Date: Aug. 5, 2021

(87) PCT Pub. No.: WO2020/161128
PCT Pub. Date: Aug. 13, 2020

(65) Prior Publication Data
US 2022/0128736 A1    Apr. 28, 2022

(30) Foreign Application Priority Data
Feb. 5, 2019 (EP) .................... 19305137

(51) Int. Cl.
*G02B 1/111* (2015.01)
*G02B 1/04* (2006.01)

(52) U.S. Cl.
CPC .............. *G02B 1/111* (2013.01); *G02B 1/041* (2013.01)

(58) Field of Classification Search
CPC .......... G02B 1/111; G02B 1/041; G02B 1/00; G02B 1/04; G02B 1/10; G02B 1/11; G02B 1/12; G02B 1/16; G02B 5/28; G02B 5/285; G02B 5/286; G02B 5/287; C23C 14/00; C23C 14/0682; C23C 14/0694; C23C 14/10; C23C 14/12; C23C 14/22; C23C 14/221; C23C 14/34; C23C 14/3435; C23C 14/3442; C23C 16/06; C23C 16/08; C23C 16/18; C23C 16/42; C23C 16/44; C23C 16/448; C23C 16/486; C23C 16/487

USPC ....... 359/601, 577, 580, 581, 585, 586, 588, 359/589, 590, 609; 427/523, 525, 527, 427/585, 588, 592, 593, 595, 162, 164, 427/165, 166, 167, 248.1, 255.11, 255.14, 427/255.18, 255.17, 255.23, 255.28, 427/255.29, 255.37, 255.39, 255.393
See application file for complete search history.

(56) References Cited

U.S. PATENT DOCUMENTS

| | | |
|---|---|---|
| 5,508,368 A | 7/1996 | Knapp et al. |
| 6,472,017 B2 | 10/2002 | Veerasamy et al. |
| 6,919,134 B2 | 7/2005 | Mitsuishi et al. |
| 2001/0053412 A1 | 12/2001 | Veerasamy et al. |
| 2002/0001725 A1 | 1/2002 | Ichimura |
| 2002/0192371 A1 | 12/2002 | Veerasamy et al. |
| 2003/0198818 A1 | 10/2003 | Mitsuishi et al. |
| 2006/0023311 A1 | 2/2006 | Scherer et al. |
| 2006/0257557 A1 | 11/2006 | Scherer et al. |
| 2006/0275556 A1 | 12/2006 | Scherer et al. |
| 2007/0104891 A1 | 5/2007 | Fournand |
| 2013/0236710 A1 | 9/2013 | Honda et al. |
| 2014/0354945 A1 | 12/2014 | Martinu et al. |
| 2016/0139304 A1 | 5/2016 | Chiarotto et al. |

FOREIGN PATENT DOCUMENTS

| | | | |
|---|---|---|---|
| EP | 1123905 | 8/2001 | |
| EP | 1307907 | 2/2011 | |
| FR | 2843407 A1 * | 2/2004 | ............. C23C 14/10 |
| FR | 2985255 A1 * | 7/2013 | ............. C03C 17/38 |
| FR | 3007024 A1 * | 12/2014 | ........... C03C 17/001 |
| JP | H05323103 | 12/1993 | |
| WO | WO 2017/021670 | 2/2017 | |

OTHER PUBLICATIONS

International Search Report and Written Opinion issued in PCT Application No. PCT/EP2020/052740, dated Apr. 7, 2020.

* cited by examiner

*Primary Examiner* — Arnel C Lavarias
(74) *Attorney, Agent, or Firm* — Norton Rose Fulbright US LLP

(57) ABSTRACT

An article including a substrate having at least one main surface coated with a layer A having a refractive index lower than or equal to 1.50, said layer A being obtained by deposition of activated species issued from at least one compound C in gaseous form, containing in its structure at least one Si-fluoroalkyl group, at least one carbon atom, at least one hydrogen atom and optionally at least one nitrogen atom and/or at least one oxygen atom, the deposition of said layer A being carried out by applying a bombardment with an ion beam to layer A while layer A is being formed, and said layer A being formed in the absence of inorganic precursor compounds. Application to the preparation of interferential coatings.

20 Claims, No Drawings

ARTICLE COATED WITH A LOW REFRACTIVE INDEX LAYER BASED ON FLUORINATED ORGANOSILICON COMPOUNDS

CROSS-REFERENCE TO RELATED APPLICATIONS

This application is a national phase application under 35 U.S.C. § 371 of International Application No. PCT/EP2020/052740 filed 4 Feb. 2020, which claims priority to European Patent Application No. 19305137.2 filed 5 Feb. 2019. The entire contents of each of the above-referenced disclosures is specifically incorporated by reference herein without disclaimer.

The present invention generally relates to an article, preferably an optical article, especially an ophthalmic lens, having an organic layer based on organosilicon compounds, which combines very good mechanical properties and a low refractive index, and to a process for producing such an article.

It is known to coat mineral or organic optical articles such as ophthalmic lenses or screens with interferential coatings, in particular antireflection coatings, which are generally formed from a multilayer stack of dielectric mineral materials such as SiO, $SiO_2$, $Si_3N_4$, $TiO_2$, $ZrO_2$, $Al_2O_3$, $MgF_2$ or $Ta_2O_5$.

An antireflective coating prevents the formation of parasitic reflections which are a nuisance to the wearer and the people it is interacting with, in the case of an ophthalmic lens.

A reflective coating produces the reverse effect, that is to say that it increases the reflection of the light rays. Such a type of coating is used, for example, to obtain a mirror effect in sunglass lenses.

One of the problems encountered with any type of mineral interferential coating, this type of coating generally being deposited by vacuum evaporation or by sputtering, is its high fragility from a mechanical point of view mainly due to its mineral nature. These coatings are internally strained to a greater or lesser extent and may find it difficult to undergo a deformation or a substantial dilation, because the stress experienced often results in a problem with adherence and/or cracking that propagates over all of the area of the coating, generally making it unusable, this problem getting worse as the thickness of the layers increases.

For example, during the edging and fitting of a glass by an optician, the glass undergoes mechanical deformations that may produce cracks in mineral interferential coatings, in particular when the operation is not carried out with care. Similarly, thermal stresses (heating of the frame) may produce cracks in the interferential coating. Depending on the number and the size of the cracks, the latter may mar the field of view of the wearer and prevent the glass from being sold.

The application WO 2013/098531, on behalf of the applicant, describes an article having improved thermomechanical performances, comprising a substrate having at least one main surface coated with a multilayer interferential coating, said coating comprising a layer A not formed from inorganic precursor compounds having a refractive index of less than or equal to 1.55, which can constitute the external layer of the interferential coating, and which has been obtained by deposition, under an ion beam, of activated species resulting from at least one organosilicon precursor compound in gaseous form, such as octamethylcyclotetrasiloxane (OMCTS).

Patent applications WO 2014/199103 and WO 2017/021670, in the name of the applicant, describe a multilayer interferential coating obtained through a similar technology, comprising at least one layer obtained from an organosilicon precursor such as 2,4,6,8-tetramethylcyclotetrasiloxane (TMCTS) or decamethyltetrasiloxane (DMTS).

These layers based on organosilicon compounds have interesting mechanical properties, but in practice, their refractive indexes are too high, generally over 1.5, which is a problem for antireflective coatings.

Indeed, the use of materials having a low refractive index (n≤1.50) in antireflective coatings is advantageous, since the lower the refractive index, the better the optical performance. For example, $SiO_2$, which has a refractive index of 1.48 at 500 nm, has better antireflection performance, but lower mechanical properties, in particular lower elasticity.

Another existing low refractive index material, $MgF_2$, generally needs to be heated at high temperature, such as 250° C. to get good adhesion properties, which prevents its use on organic substrate materials. Further, $MgF_2$ is sensitive to water when deposited at low temperature, such as the low temperatures required for polymer deposition.

The use of hollow or porous materials is another solution to ensure a low refractive index, but they are generally very water sensitive. As an alternative, materials deposited by glancing angle deposition can be employed, but their mechanical properties are not sufficient due to their porosity.

An objective of the present invention is to propose an efficient means for satisfactorily reducing the inherent fragility of mineral interferential coatings. The invention aims at obtaining a coating, in particular an interferential coating, and especially an antireflection coating, having a layer with a low refractive index while preserving high thermomechanical and durability properties. In particular, the invention relates to articles possessing an improved critical temperature, i.e. having a good resistance to cracking when they are subjected to a temperature increase.

Another objective of the invention is to provide a process for manufacturing an interferential coating, which process is simple, easy to implement and reproducible.

The inventors have discovered that modifying the nature of one or more inorganic layers of the interferential coating, namely at least one low refractive index layer, typically a silica layer, allows the targeted objectives to be achieved. According to the invention, this low refraction index layer is formed by deposition, under an ion beam, of activated species, which species are obtained from fluorinated organic precursor materials in gaseous form, in the absence of inorganic precursors.

To address the needs of the present invention and to remedy to the mentioned drawbacks of the prior art, the applicant provides an article comprising a substrate having at least one main surface coated with a layer A having a refractive index lower than or equal to 1.50, said layer A being obtained by deposition of activated species issued from at least one compound C in gaseous form, containing in its structure at least one Si—R group, where R is a fluoroalkyl group, at least one carbon atom, at least one hydrogen atom and optionally at least one nitrogen atom and/or at least one oxygen atom, the deposition of said layer A being carried out by applying a bombardment with an ion beam to layer A while layer A is being formed, and said layer A being not formed from inorganic precursor compounds.

DETAILED DESCRIPTION OF THE INVENTION

In the present application, when an article has one or more coatings on its surface, the expression "to deposit a layer or a coating on the article" is understood to mean that a layer or a coating is deposited on the uncovered (exposed) surface of the external coating of the article, i.e. its coating furthest from the substrate.

A coating that is "on" a substrate or that has been deposited "on" a substrate is defined as a coating that (i) is positioned above the substrate, (ii) does not necessarily make contact with the substrate (although preferably it does), i.e. one or more intermediate coatings may be arranged between the substrate and the coating in question, and (iii) does not necessarily completely cover the substrate (although preferably it will do). When "a layer 1 is located under a layer 2", it will be understood that the layer 2 is further from the substrate than the layer 1.

The article produced according to the invention comprises a substrate, preferably a transparent substrate, having front and rear main faces, at least one of said main faces and preferably both main faces comprising a layer A.

The "rear face" of the substrate (the rear face is generally concave) is understood to be the face that, when the article is being used, is closest to the eye of the wearer. Conversely, the "front face" of the substrate (the front face is generally convex) is understood to be the face that, when the article is being used, is furthest from the eye of the wearer.

Although the article according to the invention may be any type of article, such as a screen, a glazing unit, a pair of protective glasses that may especially be used in a working environment, a mirror, or an article used in electronics (e.g., OLED), it is preferably an optical article, more preferably an optical lens, and even more preferably an ophthalmic lens for a pair of spectacles, or a blank optical or ophthalmic lens such as a semi-finished optical lens, and in particular a spectacle glass. The lens may be a polarized or tinted lens or a photochromic lens. Preferably, the ophthalmic lens according to the invention has a high transmission.

The layer A according to the invention may be formed on at least one of the main faces of a bare substrate, i.e. an uncoated substrate, or on at least one of the main faces of a substrate already coated with one or more functional coatings.

The substrate of the article according to the invention is preferably an organic eyeglass, for example made of thermoplastic or thermosetting plastic. This substrate may be chosen from the substrates mentioned in patent application WO 2008/062142, and may for example be a substrate obtained by (co)polymerization of diethyleneglycol bis-allylcarbonate, a poly(thio)urethane substrate or a substrate made of (thermoplastic) bis-phenol-A polycarbonate (PC).

Before the layer A is deposited on the substrate, which is optionally coated, for example with an anti-abrasion and/or anti-scratch coating, it is common to subject the surface of said optionally coated substrate to a physical or chemical activation treatment intended to increase the adhesion of the layer A. This pretreatment is generally carried out under vacuum. It may be a question of a bombardment with energetic and/or reactive species, for example an ion beam (ion pre-cleaning or IPC) or an electron beam, a corona discharge treatment, a glow discharge treatment, a UV treatment or treatment in a vacuum plasma, generally an oxygen or argon plasma. It may also be a question of an acidic or basic surface treatment and/or a treatment with solvents (water or organic solvent(s)). Several of these treatments may be combined. By virtue of these cleaning treatments, the cleanliness and the reactivity of the surface of the substrate are optimized.

The term "energetic species" (and/or "reactive species") is particularly understood to mean ionic species having an energy ranging from 1 to 300 eV, preferably from 1 to 150 eV, better still from 10 to 150 eV and even better still from 40 to 150 eV. The energetic species may be chemical species, such as ions, radicals, or species such as photons or electrons.

The preferred pre-treatment of the surface of the substrate is an ion bombardment treatment carried out by means of an ion gun, the ions being particles formed from gas atoms from which one or more electrons have been stripped. Argon is preferably used as the gas ionized ($Ar^+$ ions), though oxygen or a mixture of oxygen and argon may also be used, under an acceleration voltage generally ranging from 50 to 200 V, a current density generally contained between 10 and 100 $\mu A/cm^2$ at the activated surface, and generally under a residual pressure in the vacuum chamber possibly ranging from $8\times10^{-5}$ mbar to $2\times10^{-4}$ mbar.

The article according to the invention comprises a layer A that preferably constitutes a monolayer interferential coating or a layer of a multilayer coating (preferably its external layer, i.e., the layer of the interferential coating furthest from the substrate in the stacking order), preferably a multilayer interferential coating. Said interferential coating is preferably formed on an anti-abrasion coating. Anti-abrasion coatings based on epoxysilane hydrolysates containing at least two and preferably at least three hydrolyzable groups, bonded to the silicon atom, are preferred. The hydrolyzable groups are preferably alkoxysilane groups.

The interferential coating may be any interferential coating conventionally used in the field of optics, in particular ophthalmic optics, provided that it contains a layer A formed by depositing, under an ion beam, activated species issued from at least one organic compound C in gaseous form (preferably in external position). The interferential coating may be, nonlimitingly, an antireflection coating, a reflective (mirror) coating, an infrared filter or an ultraviolet filter, an antireflective coating in the visible range but filtering ultra violet and/or blue light and/or infrared light. It is preferably an antireflection coating.

Layer A according to the invention can be used in interferential coatings for replacing conventional low refractive index materials such as silica, e.g., for obtaining a better performing antireflective coating. Layer A may be located in various places in the interferential coating. In one embodiment, the interferential coating is a monolayer interferential coating consisting of layer A. In another embodiment, the interferential coating is a multilayer interferential coating, the outermost (external) layer of which being preferably a layer A according to the invention, i.e., the layer of the interferential coating furthest from the substrate in the stacking order.

In one embodiment, the interferential coating comprises one layer A, preferably as an outermost layer. In another embodiment, the interferential coating comprises at least two layers A, identical or different.

An antireflection coating is a coating, deposited on the surface of an article, which improves the antireflection properties of the final article. It reduces the reflection of light at the article/air interface over a relatively broad portion of the visible spectrum.

As is well known, these interferential (preferably antireflection) coatings conventionally contain a monolayer or multilayer stack of dielectric materials. These are preferably multilayer coatings, comprising layers with a high refractive index (HI) and layers with a low refractive index (LI).

In the present patent application, a layer of the interferential coating is said to be a high refractive index layer when its refractive index is higher than 1.55, preferably higher than or equal to 1.6, more preferably higher than or equal to 1.8 and even more preferably higher than or equal to 2.0. A layer of an interferential coating is said to be a low refractive index layer when its refractive index is lower than or equal to 1.55, preferably lower than or equal to 1.50 and more preferably lower than or equal to 1.45. Unless otherwise indicated, the refractive indices to which reference is made in the present invention are expressed at 25° C. for a wavelength of 550 nm.

The HI layers are conventional high refractive index layers, well known in the art. They generally contain one or more mineral oxides such as, nonlimitingly, zirconia ($ZrO_2$), titanium oxide ($TiO_2$), tantalum pentoxide ($Ta_2O_5$), neodymium oxide ($Nd_2O_5$), hafnium oxide ($HfO_2$), praseodymium oxide ($Pr_2O_3$), praseodymium titanate ($PrTiO_3$), $La_2O_3$, $Nb_2O_5$, $Y_2O_3$, indium oxide $In_2O_3$, or tin oxide $SnO_2$. Preferred materials are $TiO_2$, $Ta_2O_5$, $PrTiO_3$, $ZrO_2$, $SnO_2$, $In_2O_3$ and their mixtures.

The LI layers are also well known layers and may contain, nonlimitingly, $SiO_2$, $MgF_2$, $ZrF_4$, alumina ($Al_2O_3$) in a small proportion, $AlF_3$ and their mixtures, but are preferably $SiO_2$ layers. Layers made of SiOF (fluorine-doped $SiO_2$) may also be used.

Generally, the HI layers have a physical thickness ranging from 10 nm to 120 nm and the LI layers have a physical thickness ranging from 10 nm to 100 nm.

The total thickness of the interferential coating is preferably smaller than 1 micron, more preferably smaller than or equal to 800 nm and even more preferably smaller than or equal to 500 nm. The total thickness of the interferential coating is generally larger than 100 nm, and preferably larger than 150 nm.

Even more preferably, the interferential coating, which is preferably an antireflection coating, contains at least two low refractive index (LI) layers and at least two high refractive index (HI) layers. The total number of layers in the interferential coating is preferably smaller than or equal to 8 and more preferably smaller than or equal to 6.

The HI and LI layers need not be alternated in the interferential coating though they may be in one embodiment of the invention. Two (or more) HI layers may be deposited on each other just as two (or more) LI layers may be deposited on each other.

Preferably, all the low refractive index layers of the interferential coating according to the invention except for the layer A are inorganic in nature (i.e. the other low refractive index layers of the interferential coating preferably do not contain any organic compounds).

Preferably, all the layers of the interferential coating according to the invention except for the layer A are inorganic in nature, or in other words the layer A is preferably the only layer of organic nature in the interferential coating of the invention (the other layers of the interferential coating preferably containing no organic compounds).

According to one embodiment of the invention, the interferential coating comprises a sub-layer. In this case, the sub-layer generally forms the first layer of this interferential coating in the order of deposition of the layers, i.e. the sub-layer is the layer of the interferential coating that makes contact with the underlying coating (which is generally an anti-abrasion and/or anti-scratch coating), or with the substrate when the interferential coating is deposited directly on the substrate.

The expression "sub-layer of the interferential coating" is understood to mean a coating of relatively large thickness used with the aim of improving the resistance of said coating to abrasion and/or scratches and/or to promote adhesion of the coating to the substrate or to the underlying coating. The sub-layer according to the invention may be chosen from the sub-layers described in patent application WO 2010/109154. Preferably, the sub-layer is between 100 to 200 nm in thickness. It is preferably exclusively mineral in nature and is preferably made of silica $SiO_2$.

In one embodiment, one or more so-called "impedance layers" (or adaptation layers also known as layers reducing the interference fringes) are interleaved between the sub-layer and the underlying coating (or the substrate), thus forming an impedance coating that limits interference fringes due to differences of refractive indices between the sub-layer and the underlying coating or substrate. The embodiment in which the interferential coating comprises impedance layers is fully described in WO 2018/192998.

The article of the invention may be made antistatic by incorporating at least one electrically conductive layer into the interferential coating. The term "antistatic" is understood to mean the property of not storing and/or building up an appreciable electrostatic charge. An article is generally considered to have acceptable antistatic properties when it does not attract and hold dust and small particles after one of its surfaces has been rubbed with an appropriate cloth.

The electrically conductive layer may be located in various places in the interferential coating, provided that this does not interfere with the antireflection properties of the latter. It may for example be deposited on the sub-layer of the interferential coating, if a sub-layer is present. It is preferably located between two dielectric layers of the interferential coating, and/or under a low refractive index layer of the interferential coating.

The electrically conductive layer must be sufficiently thin not to decrease the transparency of the interferential coating. Generally, its thickness ranges from 0.1 to 150 nm and preferably from 0.1 to 50 nm depending on its nature. A thickness smaller than 0.1 nm generally does not allow sufficient electrical conductivity to be obtained, whereas a thickness larger than 150 nm generally does not allow the required transparency and low-absorption properties to be obtained.

The electrically conductive layer is preferably made from an electrically conductive and highly transparent material. In this case, its thickness preferably ranges from 0.1 to 30 nm, more preferably from 1 to 20 nm and even more preferably from 2 to 15 nm. The electrically conductive layer preferably contains a metal oxide chosen from indium oxide, tin oxide, zinc oxide and their mixtures. Indium tin oxide (tin-doped indium oxide, $In_2O_3$:Sn), indium oxide ($In_2O_3$), and tin oxide $SnO_2$ are preferred. According to one optimal embodiment, the electrically conductive and optically transparent layer is a layer of indium tin oxide (ITO).

Generally, the electrically conductive layer contributes to the antireflection properties obtained and forms a high refractive index layer in the interferential coating. This is the case for layers made from an electrically conductive and highly transparent material such as layers of ITO.

The electrically conductive layer may also be a very thin layer of a noble metal (Ag, Au, Pt, etc.) typically smaller than 1 nm in thickness and preferably less than 0.5 nm in thickness.

The various layers of the interferential coating (including the optional antistatic layer) other than the layer A are preferably deposited by vacuum deposition using one of the following techniques: i) evaporation, optionally ion-assisted evaporation, ii) ion-beam sputtering, iii) cathode sputtering or iv) plasma-enhanced chemical vapor deposition. These various techniques are described in the books "Thin Film Processes" and "Thin Film Processes II", edited by Vossen and Kern, Academic Press, 1978 and 1991, respectively. The vacuum evaporation technique is particularly recommended.

Preferably, each of the layers of the interferential coating is deposited by vacuum evaporation.

Optionally, the deposition of one or more of the layers is performed by supplying (a supplementary) gas during the deposition step of the layer in a vacuum chamber, such as disclosed in US 2008/206470. Concretely, an additional gas such as a rare gas, for example argon, krypton, xenon, neon; a gas such as oxygen, nitrogen, or mixtures of two gases or more amongst these, is or are introduced into the vacuum deposition chamber while the layer is being deposited. The gas employed during this deposition step is not an ionized gas, more preferably not an activated gas.

This gas supply makes it possible to regulate the pressure and differs from an ionic bombardment treatment, such as ion assistance. It generally enables the limitation of stress in the interferential coating and to reinforce the adhesion of the layers. When such deposition method is used, which is called deposition under gas pressure regulation, it is preferred to work under an oxygen atmosphere (so called "passive oxygen"). The use of an additional gas supply during the deposition of a layer produces a layer that is structurally different from a layer deposited without additional gas supply.

The layer A is a low refractive index layer as defined according to the invention since it has a refractive index≤1.50. In some embodiments of the invention, the refractive index of the layer A is preferably lower than or equal to any one of the following values: 1.48, 1.47, 1.46, 1.45, 1.44 and 1.43.

The layer A is obtained by depositing of activated species originating from at least one compound C, in gaseous form, containing in its structure at least one Si—R group, where R is a fluoroalkyl group, at least one carbon atom, at least one hydrogen atom and optionally at least one nitrogen atom and/or at least one oxygen atom. The deposition of said layer A is carried out by applying a bombardment with an ion beam to layer A while layer A is being formed (ionic assistance, or "IAD"), and said layer A is not formed from inorganic precursor compounds.

Layer A contains in its structure carbon, silicon, fluorine, optionally oxygen and optionally nitrogen.

Preferably, the deposition is carried out in a vacuum chamber comprising an ion gun directed toward the substrates to be coated, which emits, toward said substrates, a beam of positive ions generated in a plasma within the ion gun. Preferably, the ions issued from the ion gun are particles formed from gas atoms from which one or more electrons have been stripped, the gas being a noble gas, oxygen or a mixture of two or more of these gases.

A precursor, the compound C, is introduced in a gaseous state into the vacuum chamber, preferably in the direction of the ion beam, and is activated under the effect of the ion gun.

Without wishing to be limited to any one theory, the inventors think that the plasma of the ion gun projects into a zone located a certain distance in front of the gun, without however reaching the substrates to be coated, and that activation/disassociation of the precursor compound C takes place preferentially in this zone, more generally near the ion gun, and to a lesser extent in the ion gun.

This deposition technique using an ion gun and a gaseous precursor, sometimes referred to as "ion beam deposition", is especially described in patent U.S. Pat. No. 5,508,368.

According to the invention, the ion gun is preferably the only place in the chamber where a plasma is generated.

The ion beam may, if required, be neutralized before it exits the ion gun. In this case, the bombardment is still considered to be ion bombardment as ions are still sent to the surface independently of the electrons. Generally, the ion bombardment causes atomic rearrangement in and a densification of the layer being deposited, tamping it down while it is being formed.

During the implementation of the process according to the invention, the surface to be treated is preferably bombarded by ions with a current density generally comprised between 20 and 1000 $\mu A/cm^2$, preferably between 30 and 500 $\mu A/cm^2$, more preferably between 30 and 200 $\mu A/cm^2$ at the activated surface and generally under a residual pressure in the vacuum chamber possibly ranging from $6\times10^{-5}$ mbar to $2\times10^{-4}$ mbar and preferably from $8\times10^{-5}$ mbar to $2\times10^{-4}$ mbar. An argon and/or oxygen ion beam is preferably used. When a mixture of argon and oxygen is used the $Ar:O_2$ molar ratio is preferably ≤1, more preferably ≤0.75 and even more preferably ≤0.5. This ratio may be controlled by adjusting the gas flow rates in the ion gun. The argon flow rate preferably ranges from 0 to 30 sccm. The oxygen $O_2$ flow rate preferably ranges from 5 to 30 sccm, and rises in proportion to the flow rate of the precursor compound of the layer A.

The ions of the ion beam, which are preferably issued from an ion gun used during the deposition of the layer A, preferably have an energy ranging from 75 to 150 eV, more preferably from 80 to 140 eV and even more preferably from 90 to 110 eV. The activated species formed are typically radicals or ions.

The technique of the invention differs from a deposition by means of a plasma (PECVD for example) in that it involves a bombardment, by means of an ion beam, of the layer A being formed, which beam is preferably emitted by an ion gun.

In addition to the ion bombardment during the deposition, it is possible to carry out a plasma treatment, optionally concomitant with the deposition under ion beam, of the layer A. The layer A is preferably deposited without the plasma assistance at the substrate level.

Said layer A is deposited in the presence of an oxygen source when the precursor compound C does not contain (or does not contain enough) oxygen atoms and it is desired for the layer A to contain a certain proportion of oxygen. Likewise, said layer A is deposited in the presence of a nitrogen source when the precursor compound C does not contain (or does not contain enough) nitrogen atoms and it is desired for the layer A to contain a certain proportion of nitrogen.

Apart from the layer A, other layers of the interferential coating may be deposited under an ion beam. The evaporation of the precursor materials of the layer A, carried out under vacuum, may be achieved using a joule-effect heat source.

The precursor material of the layer A comprises at least one compound C, containing in its structure at least one Si—R group, where R is a fluoroalkyl group, at least one carbon atom, at least one hydrogen atom and optionally at least one nitrogen atom and/or at least one oxygen atom. The compound C is an organosilicon compound and is considered as being organic in nature in the present application.

Preferably, the compound C contains at least one nitrogen atom and/or at least one oxygen atom and preferably at least one oxygen atom.

The concentration of each chemical element (Si, O, C, H, N) in the layer A may be determined using the Rutherford backscattering spectrometry technique (RBS), elastic recoil detection analysis (ERDA) or X-Ray photoelectron spectroscopy (XPS).

The atomic percentage of carbon atoms in the layer A is preferably lower than 40%, more preferably lower than 30%. It preferably ranges from 3 to 40%. The atomic percentage of silicon atoms in the layer A preferably ranges from 5 to 45% and more preferably from 10 to 30%. The atomic percentage of oxygen atoms in the layer A is preferably higher than 40%, more preferably higher than 50%. It preferably ranges from 35 to 70%, more preferably ranges from 40 to 65%. The atomic percentage of fluorine atoms in layer A preferably ranges from 0.5 to 8%, more preferably from 1.5 to 7%.

The O/Si atomic ratio in layer A preferably ranges from 2 to 3.5. The C/Si atomic ratio in layer A preferably ranges from 0.1 to 3. The Si/F atomic ratio in layer A preferably ranges from 3 to 30.

The fluoroalkyl group of compound C is linear or branched. It preferably comprises from 1 to 30 carbon atoms, better still from 1 to 10 or 1 to 5 and ideally from 1 to 3 carbon atoms. In one embodiment, this group is a perfluoroalkyl group.

The fluoroalkyl group of compound C is preferably a group of formula (I):

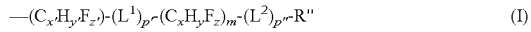

$$—(C_xH_yF_z)\text{-}(L^1)_{p'}\text{-}(C_xH_yF_z)_m\text{-}(L^2)_{p''}\text{-}R''' \quad (I)$$

wherein R''' is a hydrogen or fluorine atom, an acyl group or an alkyl group which is linear or branched, which can be substituted with one or more heteroatoms or functional groups, and which can additionally comprise one or more double bonds, $L^1$ and $L^2$ are linear or branched divalent groups which may be identical or different, x' is an integer ranging from 1 to 10, preferably from 1 to 5, better still equal to 2, y' and z' are integers such that y'+z'=2x', x is an integer ranging from 1 to 20, preferably from 1 to 15, better still from 2 to 8, y and z are integers such that y+z=2x, m is equal to 0 or 1, preferably 0, p' is equal to 0 or 1, preferably 0, and p'' is equal to 0 or 1, preferably 0. R''' can also denote an aliphatic or aromatic acyl group, in particular the acetyl or trifluoroacetyl group.

The R''' group is preferably a fluoroalkyl, better still perfluoroalkyl, group which is linear or branched. It preferably comprises from 1 to 10 carbon atoms, better still from 1 to 5 and ideally from 1 to 3 carbon atoms and represents in particular the trifluoromethyl group.

The group of formula $(C_xH_yF_z)$ is preferably a group of formula $(CF_2)_x$, wherein x is as defined previously. The group of formula $(C_xH_yF_z)$ is preferably a group of formula $(CH_2)_{x'}$, wherein x' is as defined previously.

The $L^1$ and $L^2$ groups, when they are present, can be chosen from the divalent groups L, L' and L'' previously mentioned and can also represent oxyalkylene (—O-alkylene-) or alkyleneoxy (-alkylene-O—) groups which are preferably $C_2$-$C_4$ groups, better still $C_2$-$C_3$ groups. The -$(L^2)_{p''}$-R''' group is preferably a fluoroalkyl or perfluoroalkyl group, ideally a trifluoromethyl group.

In one embodiment, the fluoroalkyl group of compound C is a group of formula (I) in which m=p'=p''=z'=0, R'''=perfluoroalkyl.

Examples of fluoroalkyl groups of formula (I) are the groups of formulae:

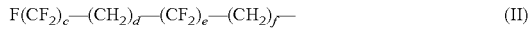

$$F(CF_2)_c\text{—}(CH_2)_d\text{—}(CF_2)_e\text{—}(CH_2)_f\text{—} \quad (II)$$

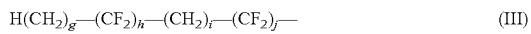

$$H(CH_2)_g\text{—}(CF_2)_h\text{—}(CH_2)_i\text{—}(CF_2)_j\text{—} \quad (III)$$

wherein each of c, d, e, f, g, h, i and j denote an integer ranging from 0 to 10, at least one of c, d, e and f is other than 0, at least one of g, h, i and j is other than 0. Preferably, 2≤c+d+e+f≤12 and/or 2≤g+h+i+j≤12, and better still 3≤c+d+e+f≤8 and/or 3≤g+h+i+j≤8.

The preferred group of formula (I) is a (perfluoroalkyl) alkyl group such as the 3,3,3-trifluoropropyl group.

The precursor compound C of the layer A preferably contains at least one silicon atom bearing at least one alkyl group, preferably a C1-C4 alkyl group, better still at least one silicon atom bearing one alkyl group, preferably a C1-C4 alkyl group, and a fluoroalkyl group directly bonded to the silicon atom (through a carbon atom). The preferred alkyl group is the methyl group. The vinyl group may also be used instead of an alkyl group. Preferably, the compound C comprises at least one C—Si—C group and better still the silicon atom of the group Si-fluoroalkyl is directly bonded to at least one (other) carbon atom.

Preferably, each silicon atom of the compound C is not directly bonded to more than two fluoroalkyl groups, better still is not directly bonded to more than one fluoroalkyl group, and better still, each silicon atom of the compound C is directly bonded to a single fluoroalkyl group. Preferably, the compound C has an Si/O atomic ratio equal to 1. Preferably, the compound C has a C/Si atomic ratio>2, more preferably >3. Again preferably, the compound C has a C/O atomic ratio>2, more preferably >3. According to one embodiment, the compound C does not comprise an Si—N group and better still does not comprise any nitrogen atoms.

The silicon atom or atoms of the precursor compound of the layer A are preferably only bonded to alkyl groups, fluoroalkyl groups, hydrogen and/or groups containing an —O—Si or —NH—Si chain so as to form an Si—O—Si or Si—NH—Si group. In one embodiment, the compound C contains at least one Si—O—Si-fluoroalkyl group or at least one Si—NH—Si-fluoroalkyl group.

The precursor compounds of the layer A preferably contain an Si—O—Si group and more preferably a group of formula:

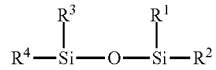

where $R^1$ to $R^4$ independently designate alkyl, vinyl, aryl, hydroxyl or hydrolyzable groups, and at least one of $R^1$ to $R^4$ designates a fluoroalkyl group. The alkyl group is preferably a C1-C4 alkyl group (for example the methyl group). The vinyl group is preferably a C2-C4 vinyl group.

Examples of hydrolyzable groups are: H, the acyloxy groups having the formula —O—C(O)$R^4$ where $R^4$ is a preferably C6-C12 aryl group optionally substituted with one or more functional groups, or a linear or branched and preferably C1-C6 alkyl group optionally substituted with one or more functional groups and possibly furthermore comprising one or more double bonds, such as the phenyl, methyl or ethyl groups; the aryloxy and alkoxy groups having the formula —O—$R^5$ where $R^5$ is a preferably C6-C12 aryl group optionally substituted with one or more functional groups, or a linear or branched and preferably C1-C6 alkyl group optionally substituted with one or more functional groups and possibly furthermore comprising one or more double bonds, such as the phenyl, methyl or ethyl groups; the halogens are preferably F, Cl, Br or I; the groups of formula —$NR^1R^2$ may designate an amino group $NH_2$ or an alkylamino, arylamino, dialkylamino or diarylamino group; $R^1$ and $R^2$ independently designate a hydrogen atom, a preferably C6-C12 aryl group optionally substituted with one or more functional groups, or a linear or branched and preferably C1-C6 alkyl group optionally substituted with one or more functional groups and possibly furthermore comprising one or more double bonds, such as the phenyl, methyl or ethyl groups; and the groups of formula —N(R$^3$)—Si, attached to the silicon atom by way of their nitrogen atom, and their silicon atom naturally comprises three other substituents, where R$^3$ designates a preferably C6-C12 aryl group optionally substituted with one or more functional groups, or a linear or branched and preferably C1-C6 alkyl group optionally substituted with one or more functional groups and possibly furthermore comprising one or more double bonds, such as the phenyl, methyl or ethyl groups.

The preferred acyloxy group is the acetoxy group. The preferred aryloxy group is the phenoxy group. The preferred halogen is Cl. The preferred alkoxy groups are the methoxy and ethoxy groups.

In one embodiment, the silicon atom or atoms of compound C are not bound to any hydrolyzable or hydroxyl group. Groups containing an Si—O—Si chain are not considered as being "hydrolyzable groups" in the context of the invention.

According to one preferred embodiment, the compound C is a cyclic polysiloxane of formula:

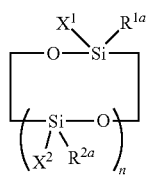

where the X$^1$ and X$^2$ groups represent independently an alkyl, a vinyl, an aryl, a hydroxyl or a hydrolyzable group (which have been described hereabove), n designates an integer ranging from 2 to 20 and preferably from 3 to 8, and the R$^{1a}$ and R$^{2a}$ groups represent independently a fluoroalkyl group. Nonlimiting examples of hydrolyzable groups for X$^1$ and X$^2$ are the chloro, bromo, alkoxy, acyloxy, aryloxy and H groups.

The most common members belonging to this group are the tetrakis(fluoroalkyl) tetraalkyl cyclotetrasiloxanes, the pentakis(fluoroalkyl) triaalkyl cyclotetrasiloxanes, the hexakis(fluoroalkyl) dialkyl cyclotetrasiloxanes, the tris(fluoroalkyl) pentaalkyl cyclotetrasiloxanes, the bis(fluoroalkyl) hexaalkyl cyclotetrasiloxanes, the tris(fluoroalkyl) trialkyl cyclotrisiloxanes, the tetrakis(fluoroalkyl) dialkyl cyclotrisiloxanes, the pentakis(fluoroalkyl) alkyl cyclotrisiloxanes, the hexakis(fluoroalkyl) cyclotrisiloxanes, the bis(fluoroalkyl) tetraalkyl cyclotrisiloxanes, the (fluoroalkyl) pentaalkyl cyclotrisiloxanes, preferably those compound wherein the alkyl groups are methyl groups, 1,3,5-tris(3,3,3-trifluoropropyl)-1,3,5-trimethylcyclotrisiloxane (FCTS of formula (IV) shown below) being the preferred compound:

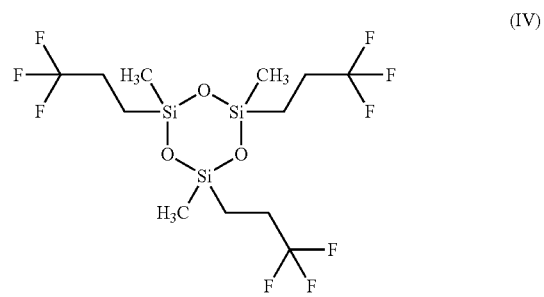 [SMILES: C[Si]1(CCC(F)(F)F)O[Si](C)(CCC(F)(F)F)O[Si](C)(CCC(F)(F)F)O1]

Other examples of compounds C are 2,2,4,4,6,6,8-heptamethyl-8-(3,3,3-trifluoropropyl)-cyclotetrasiloxane, 2,4,6,8-tetramethyl-2,4,6,8-tetrakis(3,3,3-trifluoropropyl)-cyclotetrasiloxane, 2,4,6,8,10-pentamethyl-2,4,6,8,10-pentakis(3,3,3-trifluoropropyl)-cyclopentasiloxane.

In certain cases, the layer A is obtained from a mixture of a certain number of compounds, wherein the integer n may vary within the limits indicated above.

According to another embodiment, the compound C is a linear alkyl fluoroalkyl siloxane, better still a linear methyl fluoroalkyl siloxane such as for example 1,3-dimethyl-1,3-bis(3,3,3-trifluoropropyl) disiloxane-1,3-diol, 1,3,5-trimethyl-1,3,5-tris(3,3,3-trifluoropropyl) trisiloxane-1,5-diol, 1,1,1,3,5,7,7,7-octamethyl-3,5-bis(3,3,3-trifluoropropyl) tetrasiloxane, 1,1,3,3-tetramethoxy-1,3-bis(3,3,3-trifluoropropyl)-disiloxane.

In one embodiment, layer A is formed in the presence of at least one organosilicon compound that does not contain any fluoroalkyl group.

In one embodiment, layer A is not formed from organosilicon compounds that do not contain any fluoroalkyl group. In another embodiment, layer A is not formed from organic compounds that do not contain silicon. In further embodiments, layer A is not formed from organic compounds that neither contain silicon nor fluoroalkyl group, or is not formed from organic compounds that are not compounds C according to the invention.

The precursor compound of the layer A is preferably introduced into the vacuum chamber in which articles according to the invention are produced in gaseous form, while controlling its flow rate. In other words, it is preferably not vaporized inside the vacuum chamber. The feed of the precursor compound of the layer A is preferably located a distance away from the exit of the ion gun which is ranging from 30 to 50 cm.

According to the invention, the layer A is not formed from inorganic (mineral) precursor compounds and, in particular, it is not formed from precursors having a metal oxide nature. Therefore, it is particularly different in this case from the "hybrid" layers described in patent U.S. Pat. No. 6,919,134. Preferably, the layer A does not contain a separate metal oxide phase, and more preferably does not contain any inorganic compounds. In the present application, metalloid oxides are considered to be metal oxides.

The process allowing the interferential coating according to the invention to be formed is therefore much simpler than processes in which an organic compound and an inorganic compound are coevaporated, such as the process described in patent U.S. Pat. No. 6,919,134 for example. In practice, co-evaporation processes are very difficult to implement and difficult to control due to reproducibility problems. Specifically, the respective amounts of organic and inorganic compounds present in the deposited layer vary a lot from one operation to another.

Since the layer A is formed by vacuum deposition, it does not contain any silane hydrolysate and therefore differs from sol-gel coatings obtained by liquid processing.

The layer A preferably has a thickness ranging from 20 to 150 nm and more preferably from 25 to 120 nm. When it forms the external layer of an interferential coating, the layer A preferably has a thickness ranging from 60 to 100 nm.

The extinction coefficient (also known as attenuation coefficient) of a particular substance, denoted k, measures the loss in energy of electromagnetic radiation traversing this medium. This is the imaginary part of the complex refractive index. Preferably, the layers A according to the invention have an extinction coefficient k at 550 of less than or equal to $10^{-3}$, preferably less than or equal to $10^{-4}$, more preferably less than or equal to $5 \times 10^{-5}$.

The mechanical properties of the layer A have been evaluated through nano-indentation measurements. To this end, the modulus of elasticity E of the material forming the layer A and its hardness H have been measured by an instrument-controlled penetration test (indentation), according to a method described in detail in the experimental part. If need be, reference will be made to the standard NF EN ISO 14577. The hardness H characterizes the ability of the material to withstand a permanent indentation or a deformation when it is brought in contact with an indenter under a compression load. The modulus of elasticity E (or Young's modulus, or storage modulus, or tensile modulus of elasticity) makes it possible to evaluate the ability of the material to deform under the effect of a force applied.

The layer A according to the invention preferably exhibits a hardness H≥5, preferably ≥5.5, more preferably ≥6.

The layer A according to the invention preferably exhibits a ratio H/E higher than or equal to 0.10; 0.11; 0.12; 0.13; 0.14; 0.15; 0.16 (the higher is better), H and E being expressed with the same unit, typically MPa or GPa.

Without being linked by a theory, it is thought that the H/E ratio expresses the fracture resistance (resistance to the propagation of the crack). The layer and the articles according to the invention are durable as they exhibit a good fracture resistance.

The modulus of elasticity E of the material forming the layer A preferably varies from 30 to 80 GPa, more preferably from 40 to 60 GPa.

The critical temperature, as defined hereafter, of a coated article according to the invention is preferably higher than or equal to 80° C. In the present application, the critical temperature of an article or a coating is defined as being the temperature from which cracks are observed to appear in the stack present on the surface of the substrate, this resulting in degradation of the coating. This high critical temperature is due to the presence of the layer A on the surface of the article, as demonstrated in the experimental section.

Because of its good mechanical properties, the layer A, which optionally forms part of an interferential coating, may especially be applied to a single face of a semi-finished lens, generally its front face, the other face of this lens still needing to be machined and treated. The stack present on the front face of the lens will not be degraded by mechanical stress due to treatments to which the back face is subjected when coatings are deposited on this back face. Preferably, the average reflection factor in the visible domain (400-700 nm) of an article coated with an interferential coating according to the invention, denoted $R_m$, is lower than 2.5% per face, preferably lower than 2% per face and even more preferably lower than 1% per face of the article. In one optimal embodiment, the article comprises a substrate the two main surfaces of which are coated with an interferential coating according to the invention. The light reflection factor $R_v$ of an interferential coating according to the invention is lower than 2.5% per face, preferably lower than 2% per face, more preferably lower than 1% per face of the article, even more preferably ≤0.75%, and more preferably still ≤0.5%.

In the present application, the "average reflection factor" $R_m$ (average of the spectral reflection over the entire visible spectrum between 400 and 700 nm) and the "light reflection factor" $R_v$, are such as defined in standard ISO 13666:1998 and measured according to standard ISO 8980-4.

In one embodiment, the mean reflection factor $R_{UV}$ between 280 nm and 380 nm, weighted by the function $W(\lambda)$ defined in the ISO 13666:1998 standard is lower than 10%, preferably lower than 7% or 5%, preferably on the rear main face of the article coated with an interferential coating according to the invention.

Ruv is the mean reflection factor of a face of an optical article between 280 nm and 380 nm, weighted by the function $W(\lambda)$ defined in the ISO 13666:1998 standard, measured in the present application at an angle of incidence of 35° for the back (rear) main face and at an angle of incidence of 15° for the front main face. Definition of $W(\lambda)$ and calculation examples for angles of incidence at 30° and 45° are specified in WO 2012/076714. The person skilled in the art can easily implement calculation based on reflection values measured on the respective faces at the wished incidence angle (15°, 35°).

The colorimetric coefficients C* and h of the optical article of the invention in the international colorimetric CIE L*a*b* are calculated between 380 and 780 nm, taking the standard illuminant D65 and the observer into account (angle of incidence: 15°). The observer is a "standard observer" (10°) as defined in the international colorimetric system CIE L*a*b*.

In some aspects of the invention, the optical material has a chroma (C*) that is lower than 10 (for an angle of incidence of 15°), more preferably lower than 5, 4, 3 or 2. Obtaining low residual color intensity (chroma) articles is preferable with respect to wearer's comfort viewpoint, in the cases of lenses.

In some applications, it is preferable for the main surface of the substrate to be coated with one or more functional coatings prior to the deposition of the layer A or the multilayer coating comprising layer A. These functional coatings, which are conventionally used in optics, may, without limitation, be a primer layer for improving the shock-resistance and/or adhesion of subsequent layers in the final product, an anti-abrasion and/or anti-scratch coating, a polarized coating, a photochromic coating or a tinted coating, and may in particular be a primer layer coated with an anti-abrasion and/or anti-scratch layer. The latter two coatings are described in greater detail in the patent applications WO 2008/015364 and WO 2010/109154.

The article according to the invention may also comprise coatings, formed on the interferential coating, capable of modifying the surface properties of the interferential coating, such as a hydrophobic coating and/or oleophobic coating (anti-fouling top coat) or an anti-fogging coating. These coatings are preferably deposited on the external layer of the interferential coating. They are generally lower than or equal to 10 nm in thickness, preferably from 1 to 10 nm in thickness and more preferably from 1 to 5 nm in thickness. They are described in patent applications WO 2009/047426 and WO 2011/080472, respectively.

Typically, an article according to the invention comprises a substrate successively coated with an adhesion and/or anti-shock primer layer, an anti-abrasion and/or anti-scratch coating, an optionally antistatic interferential coating according to the invention and containing a layer A generally as an external layer, and a hydrophobic and/or oleophobic coating.

The invention also relates to a process for manufacturing an article such as defined above, comprising at least the following steps:
providing an article comprising a substrate having at least one main surface,
depositing on said main surface of the substrate a layer A having a refractive index lower than or equal to 1.50,
recovering an article comprising a substrate having a main surface coated with said layer A, said layer A being obtained by deposition of activated species issued from at least one compound C in gaseous form, containing in its structure at least one Si—R group, where R is a fluoroalkyl group, at least one carbon atom, at least one hydrogen atom and, optionally, at least one nitrogen atom and/or at least one oxygen atom, the deposition of said layer A being carried out by applying a bombardment with an ion beam to layer A while layer A is being formed, and said layer A being not formed from inorganic precursor compounds.

The invention is illustrated in a nonlimiting way by the following examples. Unless otherwise indicated, refractive indices are given for a wavelength of 550 nm and T=20-25° C.

EXAMPLES

1. General Procedures

The articles employed in examples 1 and comparative examples C1-C4 have ORMA® substrates with a thickness of 2.0 mm, coated in this order from the core to the outside of the lens, with an impact resistant primer coating based on a W234™ polyurethane material disclosed in the experimental part of WO 2010/109154, and deposited over it the abrasion- and a scratch-resistant coating (hard coat) disclosed in example 3 of EP 0614957 (having a refractive index of 1.48), said hard coat being coated with a monolayer layer A according to the invention or a comparative layer (monolayer).

In examples 6-7, the substrate was a 65 mm-diameter polythiourethane MR8® lens substrate (from Mitsui Toatsu Chemicals Inc., refractive index=1.59), with a power of −2.00 diopters and a thickness of 2.0 mm, coated on its concave face (example 7) or convex face (example 6), with an impact resistant primer polyurethane coating having a refractive index of 1.6 and, applied over it, an abrasion- and scratch-resistant coating (hard coat, having a refractive index of 1.6).

In examples 2-5, the configuration was the same as in example 1, the substrate was an ORMA® lens substrate (polymer obtained by polymerization of diethylene glycol bis (allyl carbonate) from Essilor based on CR-39® monomer, refractive index=1.5) lens substrate. The concave face (example 5) or convex face (examples 2-4) of the substrate was the coated face.

The vacuum deposition reactor was a box coater (Boxer Pro, Leybold Optics) machine equipped with an electron beam source (HPE-6) that can be used for the evaporation of the precursor materials, with a thermal evaporator, with an end Hall ion source (ion gun) eH-1000 (from Kaufman & Robinson Inc.) for use in the preliminary phase of (IPC) preparation of the surface of the substrate by argon ion bombardment and in the ion-assisted deposition (IAD) of the layer A or of other layers, and with a system for introducing liquid, which system was used when the precursor compound of the layer A was a liquid under the operation conditions (the case of the compound of formula (IV)). This system comprises a reservoir containing the liquid precursor compound of the layer A, resistive heaters for heating the reservoir (generally at 120° C.), tubes connecting the reservoir of liquid precursor to the vacuum deposition machine, and a vapor flowmeter from MKS (MKS1150C), raised to a temperature of 30-150° C. during its use, depending on the flow rate of the vaporized precursor, which preferably varied from 1 to 50 sccm, preferably from 1 to 30 sccm, more preferably from 1 to 20 sccm, even better from 1 to 10 and optimally 2 to 10 sccm. The precursor vapor exited from a tube inside the machine, at a distance of about 30 cm from the ion gun. Flows of oxygen and optionally of argon were introduced into the ion gun. Preferably, neither argon nor any other noble gas is introduced into the ion gun.

The layers A according to the invention were formed by vacuum evaporation under oxygen ion bombardment of the compound of formula (IV) [CAS n° 2374-14-3], without heating the substrate. Comparative layers were formed similarly from the compounds $SiO_2$, DMTS (decamethyltetrasiloxane), TMCTS (2,4,6,8-tetramethylcyclotetrasiloxane) and/or $C_2F_6$.

The thickness of the deposited layers was controlled in real time by means of a quartz microbalance. Unless otherwise indicated, the thicknesses mentioned are physical thicknesses.

2. Operating Modes

The method used to produce optical articles according to the invention comprised introducing the substrate into the vacuum deposition chamber; a step of preheating the vaporizer, tubes and the vapor flowmeter to the chosen temperature (~20 min); a primary pumping step; then a secondary pumping step lasting 400 seconds and allowing a secondary vacuum to be obtained (~$2\times10^{-5}$ mbar, pressure read from a Bayard-Alpert gauge); a step of activating the surface of the substrate with a beam of argon ions (IPC: 1 minute, 100 V, 1 A, the ion gun being stopped at the end of this step); and then successively evaporating the required number of layers (optional intermediate optical impedance layers, optional sub-layer, and antireflection coating layers including layer A) at a rate ranging from 0.05 to 3 nm/s, and lastly a ventilation step. Layer A was deposited by evaporation assisted by a beam of oxygen.

Suitable deposition conditions of a representative optical article (example 7) are as follows: a deposition step of an $SiO_2$ optical (impedance) layer at a rate of 1 nm/s under an $O_2$ pressure of $8.10^{-5}$ mBar, a deposition step of a thin $ZrO_2$ optical (impedance) layer at a rate of 1 nm/s under an $O_2$ pressure of $6.10^{-5}$ mBar, a surface activation step using an argon ion beam for 30 seconds (same treatment as IPC already conducted directly on the substrate), a deposition step of a $SiO_2$ sub-layer at a rate of 3 nm/s under an $O_2$ atmosphere at a pressure of $1.3\times10^{-4}$ mBar, a surface activation step of the sub-layer using an argon ion beam for 30 seconds (same treatment as IPC already conducted directly on the substrate), stopping the ionic irradiation, a deposition step of a HI layer ($ZrO_2$) at a rate of 2 nm/s under an $O_2$ pressure of $6.10^{-5}$ mBar, a deposition step of a LI layer ($SiO_2$) at a rate of 2 nm/s, a deposition step of a HI layer ($ZrO_2$) at a rate of 2 nm/s under an $O_2$ pressure of $6.10^{-5}$ mBar, a deposition step of an $SnO_2$ layer (HI, electrically conductive) at a rate of 1 nm/s with an oxygen ion assistance (ion gun: 2 A, 100 V), and a deposition step of a layer A according to the invention at a rate of 0.1 nm/s.

For the deposition of layer A, the ion gun was started with argon, oxygen was added in the ion gun with a set flow rate (15 sccm), the flow of argon was cut, the desired anode current (3 A) was input and the compound of formula (IV, "FCTS") was introduced into the chamber (flow rate set to 3.5 sccm). The precursor compound supply was stopped once the desired thickness has been obtained, then the ion gun was turned off.

Examples C1-C4 are comparative examples.

Comparative example C1 differs from the stack according to the invention of example 1 in that the layer A is replaced with a silica layer evaporated with an electron beam, without ion assistance.

Comparative examples C2 to C4 differ from the stack according to the invention of example 1 in that the layer A is replaced by a layer obtained under the same conditions by evaporating, under ion bombardment, the compound TMCTS (2,4,6,8-tetramethylcyclotetrasiloxane, which possesses no fluoroalkyl group) or a combination of the compounds $C_2F_6$ and DMTS (decamethyltetrasiloxane), in place of the compound of formula (IV).

The deposition rates were 0.07 nm/s for example 1, 0.82 nm/s for example C1, 0.38 nm/s for example C2, 0.43 nm/s for example C3, 0.27 nm/s for example C4.

3. Characterizations

The critical temperature of the article was measured 24 hours after its preparation, in the way indicated in the application WO 2008/001011 for the measurement of the critical temperature, except that the relative humidity was not 50% but >90%, typically 100%.

The measurements of refractive index n and of extinction coefficient k (defined in the application WO 2005/059603) were carried out by ellipsometry at the wavelength of 550 nm in the manner disclosed in WO 2015/166144.

A triboindenter TI 950 system (Hysitron, Inc.) equipped with a Berkovich tip was employed in order to determine the mechanical properties of the coatings (i.e., the modulus of elasticity E, the hardness H and the elastic recovery R of the material constituting the layers) by the depth-sensing indentation technique. This nano-indentation measurement is detailed in WO 2015/166144. From the measurements, the indentation cycles were analyzed using the Oliver and Pharr approach disclosed in "Improved technique for determining hardness and elastic modulus using load displacement sensing indentation experiments", Journal of Materials Research, Vol. 7, pp. 1564-1583, 1992. Subsequently, ISO 14577-4 standard was used to extract the (E) and (H) characteristics of the films.

The elastic recovery R corresponds to the portion of the given back total energy returned following the indentation test. The higher the elastic recovery, the less permanent deformation remains after the test. It was evaluated by dividing the reversible work of indentation ($W_e$) over the total work of indentation ($W_{total}$). In this study, R is determined using indentations made with a 1000 µN maximum applied load for all sample in order to obtain a contact depth greater than the round part of the tip whilst having small enough penetration depth to minimize the substrate effect:

$$R = \frac{W_e}{W_{total}} [\%]$$

Abrasion resistance was evaluated by determining Bayer ASTM (Bayer sand) values for substrates coated with the antireflection coating, using the methods described in patent application WO 2008/001011 (standard ASTM F 735.81). The higher the value obtained in the Bayer test, the higher the resistance to abrasion. Thus, the Bayer ASTM (Bayer sand) value was deemed to be good when it was higher than or equal to 3.4 and lower than 4.5 and excellent for values of 4.5 or more.

Colorimetric measurements (in reflection) of the face coated with the interferential coating of the invention: reflection factors Rv and Ruv, hue angle h and chroma C* in the international colorimetric CIE (L*, a*, b*) space were carried out with a Zeiss spectrophotometer, taking into account the standard illuminant D65, and the standard observer 10° (for h and C*). They are provided for an angle of incidence of 15°.

4. Results

The tables below indicate for each of the examples and comparative examples the results of the tests to which the articles were subjected. The sub-layer line in the table is bolded and italicized.

TABLE 1

| Ex. | Material evaporated | Precursor flow rate (sccm) | $O_2$ flow rate (sccm) | I (A) | Thickness of the layer (nm) | n | k | E (GPa) | H (GPa) | H/E | % R |
|---|---|---|---|---|---|---|---|---|---|---|---|
| C1 | $SiO_2$ | N/A | 0 | 0 | 206 | 1.47 | 0 | 38 | 3.6 | 0.10 | 0.48 |
| 1 | Compound (IV) | 3.5 | 15 | 3 | 370 | 1.43 | $5 \times 10^{-5}$ | 42 | 6.2 | 0.15 | 0.75 |
| C2 | TMCTS | 6 | 15 | 3 | 248 | 1.53 | $2 \times 10^{-4}$ | 32 | 4.2 | 0.13 | 0.62 |
| C3 | TMCTS | 9 | 30 | 3 | 277 | 1.51 | $5 \times 10^{-4}$ | 17 | 2.8 | 0.16 | 0.71 |
| C4 | DMTS/C2F6 | 5/20 | 15 | 3 | 454 | 1.50 | $6 \times 10^{-3}$ | 26 | 3.3 | 0.13 | 0.65 |

N/A: not applicable.
% R: Elastic recovery at 1 mN.
n: refractive index at 550 nm.
I: Anode current.
k: extinction coefficient at 550 nm.

Example 2

| Substrate + primer/hard coat | |
|---|---|
| $ZrO_2$ (b) | 28 nm |
| $SiO_2$ | 19 nm |
| $ZrO_2$ (b) | 78 nm |
| $SnO_2$ (c) | 6.5 nm |
| Compound (IV)* (c) | 83 nm |
| Rv (%) | 0.45 |
| h | 149° |
| C* | 5.7 |

Example 3

| Substrate + primer/hard coat | |
|---|---|
| $ZrO_2$ (b) | 23 nm |
| $SiO_2$ | 18 nm |
| $ZrO_2$ (b) | 93 nm |
| $SnO_2$ (c) | 6.5 nm |
| Compound (IV)** (c) | 82 nm |
| Rv (%) | 0.40 |
| h | 149° |
| C* | 5.3 |

Example 4

| Substrate + primer/hard coat | |
|---|---|
| $ZrO_2$ (b) | 27 nm |
| $SiO_2$ | 20 nm |
| $ZrO_2$ (b) | 74 nm |
| $SnO_2$ (c) | 6.5 nm |
| Compound (IV)** (c) | 87 nm |
| Rv (%) | 0.20 |
| h | NA |
| C* | 0.2 |

Example 5

| Substrate + primer/hard coat | |
|---|---|
| $ZrO_2$ (b) | 16 nm |
| $SiO_2$ | 23 nm |
| $ZrO_2$ (b) | 100 nm |
| $SnO_2$ (c) | 6.5 nm |
| Compound (IV)** (c) | 81 nm |
| Rv (%) | 0.27 |
| C* | 0.6 |
| Ruv (%) | 2.7 |

Example 6

| Substrate + primer/hard coat | | |
|---|---|---|
| $SiO_2$ | 50 | nm |
| $ZrO_2$ (a, b) | 2 | nm |
| $SiO_2$ (a, b) | 156 | nm |
| $ZrO_2$ (b) | 22 | nm |
| $SiO_2$ | 20 | nm |
| $ZrO_2$ (b) | 93 | nm |
| $SnO_2$ (c) | 6.5 | nm |
| Compound (IV)** (c) | 84 | nm |
| Rv (%) | 0.28 | |
| C* | 0.3 | |

Example 7

| Substrate + primer/hard coat | |
|---|---|
| SiO2 | 56 nm |
| ZrO2 (a, b) | 5 nm |
| SiO2 (a, b) | 290 nm |
| ZrO2 (b) | 15 nm |
| SiO2 | 28 nm |
| ZrO2 (b) | 107 nm |
| SnO2 (c) | 6.5 nm |
| Compound (IV) ** (c) | 77 nm |
| Rv (%) | 0.43 |
| C* | 1.0 |
| Ruv (%) | 2.8 |

*Refractive index: 1.45.
**Refractive index: 1.43.
Refractive index 1.45 can be obtained with increased current or oxygen pressure
(a) Ionic bombardment treatment of the layer surface before depositing the next layer.
(b) Oxygen supply during deposition.
(c) Ion assisted deposition (IAD).

The low refractive index layer obtained from compound (IV) in the articles according to the invention exhibit a lower refractive index than the comparative articles. The obtained articles of the invention exhibit a low light reflection factor in the visible range Rv, a low mean reflection factor Ruv between 280 nm and 380 nm, while retaining a relatively low extinction coefficient at 550 nm, and good H/E ratio and elastic recovery (elastic recovery higher than 0.7) as compared to articles with a layer made from other silicon and/or fluorine containing precursor materials. The H/E ratio and an elastic recovery are markedly improved with respect to a layer exclusively composed of silica (example C1). An H/E ratio of around 0.15 indicates a very good mechanical strength. The nano-indentation curves indicated that the article of example 1 is is harder than that of example C1, and yet more elastic than that of examples C2 or C3.

Similar results as example 1 were obtained with a layer A having a thickness of 273 nm.

The atomic percentages of elements in layer A of example 1 were as follows: 23.17% Si, 57.11% O, 15.71% C, 4.01% F.

The stability of the layers in a humid environment was also tested (relative humidity>90%). The articles of example 1, C2 and C4 passed the critical temperature test at 80° C. (i.e., not cracked at 80° C. under these conditions), while the article of example C1 did not (cracking was showed).

The refractive index of layer A in example 1 is stable after 3 days. It only increased to 1.45 after 1000 hours.

Concerning abrasion resistance, the articles of examples 1, C1 and C4 all presented a sand Bayer ratio around 6, indicating very good abrasion resistance.

Therefore, the invention provides a new material for making optical layers, which combines the low refractive index of silica and the mechanical and durability properties of known materials based on non fluorinated organosilicon compounds.

The invention claimed is:

1. An article comprising a substrate having at least one main surface coated with a layer A having a refractive index lower than or equal to 1.50, wherein said layer A was obtained by deposition of activated species issued from at least one compound C in gaseous form, containing in its structure at least one Si—R group, where R is a fluoroalkyl group, at least one carbon atom, at least one hydrogen atom and optionally at least one nitrogen atom and/or at least one oxygen atom, the deposition of said layer A is carried out by applying a bombardment with an ion beam to layer A while layer A is being formed, and said layer A is not formed from inorganic precursor compounds.

2. The article as claimed in claim 1, wherein the ion beam is emitted by an ion gun.

3. The article as claimed in claim 1, wherein an atomic percentage of carbon atoms in layer A is lower than 40%.

4. The article as claimed in claim 1, wherein an atomic percentage of carbon atoms in layer A is lower than 30%.

5. The article as claimed in claim 1, wherein an atomic percentage of oxygen atoms in layer A is higher than 40%.

6. The article as claimed in claim 1, wherein an atomic percentage of fluorine atoms in layer A ranges from 0.5 to 8%.

7. The article as claimed in claim 1, wherein an O/Si atomic ratio in layer A ranges from 2 to 3.5.

8. The article as claimed in claim 1, wherein layer A has a refractive index lower than or equal to 1.45.

9. The article as claimed in claim 1, wherein compound C contains at least one group of formula:

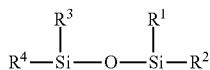

where $R^1$ to $R^4$ independently designate alkyl, vinyl, aryl, hydroxyl or hydrolyzable groups, and at least one of $R^1$ to $R^4$ designates a fluoroalkyl group.

10. The article as claimed in claim 1, wherein compound C is a compound of formula:

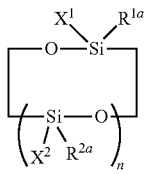

where the $X^1$ and $X^2$ groups represent independently an alkyl, a vinyl, an aryl, a hydroxyl or a hydrolyzable group, n designates an integer ranging from 2 to 20 and the $R^{1a}$ and $R^{2a}$ groups represent independently a fluoroalkyl group.

11. The article as claimed in claim 1, wherein the silicon atom or atoms of compound C are not bound to any hydrolyzable or hydroxyl group.

12. The article as claimed in claim 1, wherein layer A has a thickness ranging from 20 to 150 nm.

13. The article as claimed in claim 1, wherein layer A has a thickness ranging from 25 to 120 nm.

14. The article as claimed in claim 1, further defined as an optical lens.

15. The article as claimed in claim 1, further defined as an ophthalmic lens.

16. The article as claimed in claim 1, wherein layer A is a layer of a multilayer interferential coating.

17. The article as claimed in claim 16, wherein the interferential coating is an antireflection coating.

18. A process for manufacturing a coated article of claim 1, comprising:
providing an article comprising a substrate having at least one main surface;
depositing on said main surface of the substrate a layer A having a refractive index lower than or equal to 1.50;
recovering the coated article comprising the substrate having the main surface coated with said layer A, wherein said layer A is obtained by deposition of activated species issued from at least one compound C in gaseous form, containing in its structure at least one Si—R group, where R is a fluoroalkyl group, at least one carbon atom, at least one hydrogen atom and, optionally, at least one nitrogen atom and/or at least one oxygen atom; and
deposition of said layer A is carried out by applying a bombardment with an ion beam to layer A while layer A is being formed, and said layer A is not formed from inorganic precursor compounds.

19. The article as claimed in claim 1, wherein an atomic percentage of carbon atoms in layer A ranges from 3 to 40%.

20. The article as claimed in claim 1, wherein an O/Si atomic ratio in layer A ranges from 0.1 to 3.

* * * * *

UNITED STATES PATENT AND TRADEMARK OFFICE
CERTIFICATE OF CORRECTION

| | | |
|---|---|---|
| PATENT NO. | : 12,117,591 B2 | Page 1 of 1 |
| APPLICATION NO. | : 17/428738 | |
| DATED | : October 15, 2024 | |
| INVENTOR(S) | : Oleg Zabeida, William Trottier-Lapointe and Ludvik Martinu | |

It is certified that error appears in the above-identified patent and that said Letters Patent is hereby corrected as shown below:

In the Claims

<u>Claim 18, Column 22, Lines 14-15:</u>
Delete "of claim 1" after --article--.

Signed and Sealed this
Fourteenth Day of January, 2025

Derrick Brent
*Acting Director of the United States Patent and Trademark Office*